Figure 1:
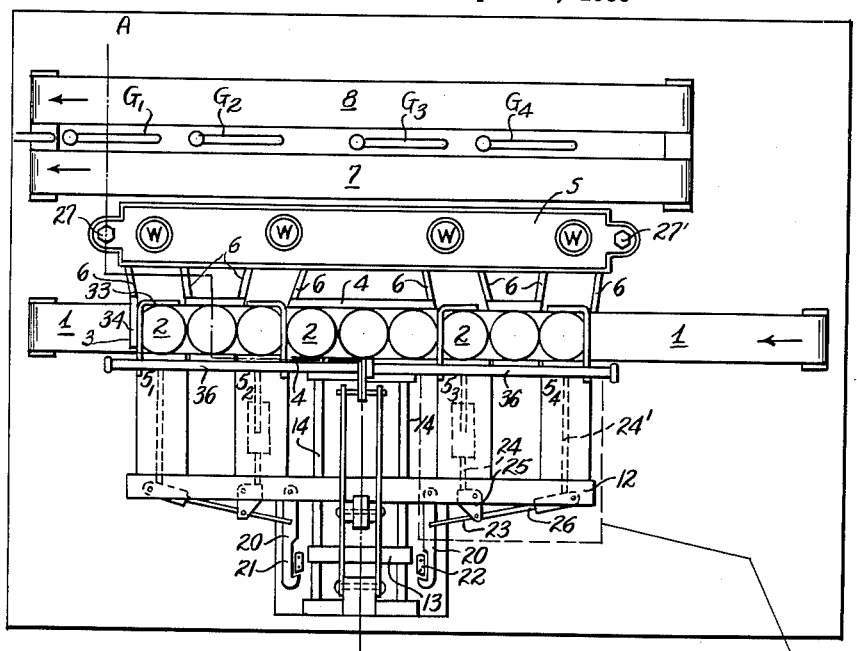

Oct. 2, 1962 T. B. HALLAM ETAL 3,056,497
MACHINE FOR ASSORTING BY WEIGHT
Filed Sept. 10, 1959

INVENTORS
T. BERTRAM HALLAM
BRIAN H. JONES
BY
Bacon & Thomas
ATTORNEYS 3,056,497
MACHINE FOR ASSORTING BY WEIGHT
Thomas Bertram Hallam, Isleworth, and Brian H. Jones, Hillingdon, England, assignors to The Sperry Gyroscope Company Limited, Brentford, England, a company of Great Britain
Filed Sept. 10, 1959, Ser. No. 839,143
5 Claims. (Cl. 209—121)

This invention relates to weighing apparatus.

According to the invention the weighing apparatus includes a plurality of weighing units for simultaneously weighing a corresponding plurality of articles to be weighed; feed mechanism for feeding a different article to be weighed on to the weighing head of each of the units in one operation; a single "acceptance" delivery channel into which is fed, after a weighing operation has been carried out upon articles on the weighing head, every article which is found to be above a certain weight; and a single "rejection" delivery channel into which is fed, after a weighing operation has been carried out upon articles on the weighing heads, every article which is found to be below the certain weight.

In one form of the invention means associated with the feed mechanism is arranged to render a weighing unit ineffective to weigh an article during that period when an article is being positioned upon or displaced from the weighing head of said weighing unit, and the arrival from the feed mechanism of an article upon the weighing head of a weighing unit is arranged to displace any article previously positioned on the weighing head into one of the delivery channels.

Further, there is included a guide associated with one of the weighing units, said guide being positioned to determine whether an article is to be fed from the weighing head of the weighing unit into the "acceptance" delivery channel or the "rejection" delivery channel depending upon whether the article is found to be above or below the certain weight.

It is of advantage if means are included for rendering the feed mechanism ineffective in the absence of a full complement for the feed mechanism of articles to be weighed.

Conveniently the feed mechanism comprises a plurality of rams arranged for simultaneous movement, the rams being arranged for movement towards respective ones of the weighing heads and each ram arranged to thrust an individual one of a group of articles to be weighed on to its associated weighing head.

Preferably there is included means adapted to convey in file to the feed mechanism the articles to be weighed and each ram is arranged for movement parallel to the direction of movement of the other rams and across the line of file of the articles to be weighed.

Preferably also each delivery channel consists of a different conveyor apparatus.

Figure 2:
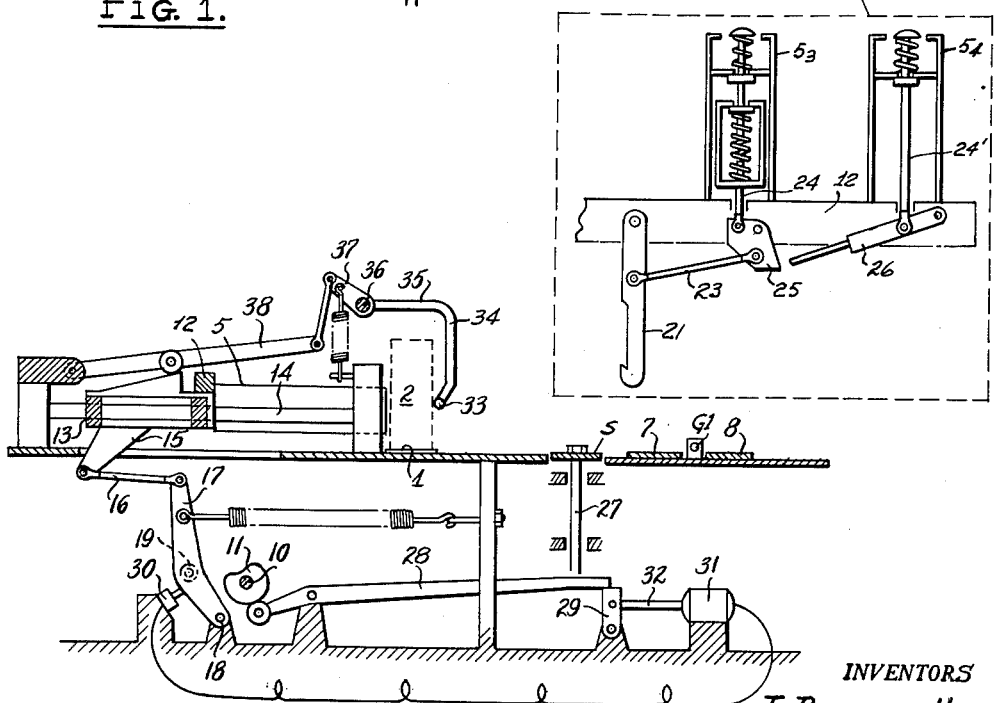

The invention may be carried into practice in various ways and one embodiment will now be described, by way of example only, with reference to the accompanying drawings in which:

FIGURE 1 is a schematic illustration, in plan, of a check weighing apparatus embodying the invention and FIGURE 2 is a schematic diagram of the check weighing apparatus of FIGURE 1 sectioned generally along A—A of FIGURE 1 with certain parts omitted and parts shown in elevation for clarity.

In the check weigher, four weighing units, each having a single weighing head W, are arranged in a line parallel with a travelling belt 1 arranged to carry cylindrical cans 2 of the commodity to be weighed one after another along the length of the belt to a waiting position defined by a stop 3 above the belt 1. The cans at the waiting position are prevented from being pushed off the belt on arrival of further cans by guides 4 placed along both sides of the belt (the feed belt).

Each weighing unit is of the displacement kind in which the weighing platform moves downwards under the weight of an article a distance proportional to the weight of the article in excess of a predetermined amount. Movement of the weighing platform results in an electrical switch (not shown) being actuated if the article is in excess of a certain minimum amount but not if the weight is less than this. Actuation of such switches by weighing means is well-known in the art. The article supplied to be weighed by the unit, on its arrival at the weighing head, has its weight supported in the well known manner, by a support mechanism (commonly known as a stripper plate mechanism) having openings over the weighing platforms W so that its weight is not applied to the weighing platform. The stripper plates are arranged to support the weight of the article above the weighing platform until actuating mechanism associated with the stripper plate causes relative movement to occur between the stripper plate and the weighing platform to permit the weight of the article to be taken by the weighing platform. After weighing of the article has taken place the stripper plate is restored to its original position relative to the weighing platform to once again support the weight of the article.

In operation of the check weigher, a feed mechanism constituted primarily of four rams 5 arranged in parallel relationship for simultaneous movement perpendicular to the direction of movement of the feed belt 1 is actuated to push four of the cans in the waiting position laterally off the feed belt and on to a different one of the weighing heads. Each can is directed towards the appropriate weighing head along a short path defined by guide rails 6, the cans thrust on to the weighing heads by the rams being the first, third, seventh and ninth cans in the line of cans at the waiting position. These particular cans are chosen so that although the weighing heads are spaced apart by a distance greater than the distance between the cans in the waiting position, no path to the weighing heads is at too acute an angle to the direction of the length of the belt.

As the rams push the four cans on to the respective weighing heads the cans in turn push from the weighing heads the four cans which have just been weighed and these are pushed on to a "rejection" delivery belt 7 which runs parallel to the feed belt 1 on the farther side of the weighing heads. On the farther side of the "rejection" delivery belt 7 and also running parallel with the feed belt 1 is an "acceptance" delivery belt 8 on to which any cans are deflected which are found to be above the minimum weight.

To effect this deflection four guide members G are used, the operation of which members being described more fully below.

Each belt, 1, 7, 8 is driven by power supplied through a cam shaft 10 (FIGURE 2) driven by a motor (not shown). Spaced apart along the cam shaft are two plate cams, the first of which 11 (FIG. 2) being arranged to control movement of the rams 5. Each ram is supported at one end and parallel to the other three by a cross piece 12 (FIG. 1) mounted upon a carriage 13 adapted, on actuation, to travel backwards and forwards along the length of a pair of guides 14 arranged at right angles to the direction of travel of the belts. A lug 15 (FIGURE 2) dependent from the carriage 13 is connected through a connecting link 16 to the free end of an arm 17 pivotally mounted at its other end about a point 18 on the framework of the check-weighing apparatus. Supported at a point along the length of the arm 17 is a cam follower 19 adapted to follow the contour of the plate cam 11, the arm being spring loaded in a direction such as to bring the cam follower 19 towards the cam surface. In the following of the cam surface by the follower, the carriage 13 is brought to one end of the guide rails 14 (the far end) to cause the rams to thrust four of the cans on to the weighing heads, and is then returned to the near end of the guide rails to retract the rams to a position where their remote ends lie adjacent to and parallel with the near edge of the feed belt to form portions of the guides 4.

During the forward stroke of the rams, travel of any further cans along the feed belt into the waiting position is prevented as each ram lies across the feed belt. On return of rams to the retracted position however, the cans are again able to be fed forward by the belt to replace those last thrust on to the weighing heads.

To ensure that the rams cannot travel forward until the appropriate cans are correctly stationed for feeding to the weighing heads, the carriage is automatically locked in position on return of the carriage to that position in which the rams are retracted.

The carriage is released for further movement only when cans delivered by the feed belt are correctly positioned for four of their number to be simultaneously thrust, each by one of the rams, on to the weighing heads.

The carriage is locked in position by both of two similar locking mechanisms 20, the two locking mechanisms being released by the correct positioning of a can opposite each ram of a first adjacent two of the rams and of the remaining two adjacent rams respectively.

Each locking mechanism comprises a latch 21 supported by the cross piece 12 to engage, when in the locking position, a catch 22 mounted on the framework of the apparatus. The latch is freed from the catch by actuation of a link 23 which is itself actuated by movement of a crank and push rod arrangement. The push-rod 24 lies along the longitudinal axis of the inner one $5_3$ of the appropriate adjacent two rams $5_3$, $5_4$ and is spring loaded to have one end projecting through and slightly beyond the end-face of the ram. The other end of the push rod 24 abuts an arm of a crank 25 supported by the cross piece 12 and connected to one end of the link 23. When a can is correctly positioned at the end of the ram $5_3$ its sides bear against the projecting portion of the push rod 24 to thrust the projecting portion into the ram end face and cause axial movement of the push rod. This movement in turn causes movement of the crank 25 which actuates the link 23 to move the latch 21 free of the catch.

Movement of the crank 25 to release the latch 21 is only permitted however, if another can is also in the correct position opposite the end face of the other one $5_4$ of the two adjacent rams to actuate a push rod 24'. The push rod 24' is similar to the push rod 24 and similarly positioned along the axis of the other one $5_4$ of the rams with one end projecting beyond the ram end face. The other end of the push rod 24' is arranged to bear against an arm 26 pivoted on the cross piece 12 at one end and having its other end butting against the crank 25. The correct positioning of a can at the end face of the ram $5_4$ is such as to cause movement of the push rod 24' to rotate the arm 26 about its pivot so shifting the arm 26 away from the crank 25 to give the crank freedom of movement. A spring link is provided in the push rod 24 to allow the projecting end of the push rod to be thrust into the ram end face even when the crank 25 is held in position by the arm 26. On actuation of the arm 26 however, any movement taken up in the spring link immediately results in release of the latch 21 from the catch 22.

The second locking mechanism which, as stated, is similar to the first and operates in a similar fashion to the operation of the first locking mechanism.

When both locking mechanisms are released by proper positioning of the cans the cam follower 19 is allowed to follow the contour of the cam 11 and so cause the rams to go forward to feed a further four cans to the weighing heads.

As stated above the cans being fed forward push the cans which have just been weighed on to the "rejection" delivery belt 7, those cans of weight greater than a minimum weight being then deflected on to the "acceptance" delivery belt 8.

To effect this deflection there are four guide members ($G_1$, $G_2$, $G_3$, $G_4$) (see FIG. 1) positioned between the two delivery belts. Each is positioned to be able to deflect cans from a different one of the weighing heads from the "rejection" delivery belt to the "acceptance" delivery belt. The guides are normally retracted in the space between the two delivery belts, as shown, so as not to deflect any cans from the "rejection" delivery belt, but if, as a result of a weighing operation on any one of the heads, it is found that the can on that head is above the minimum weight, a solenoid arrangement, not shown, may be excited and caused to operate mechanism of any suitable nature obvious to those skilled in the art to move the guide associated with that head into a position extending obliquely across the "rejection" delivery belt 7 so that when the can of weight greater than the minimum weight is carried along by the "rejection" delivery belt after it has been pushed off the weighing head, it will, before it has travelled far, make contact with the appropriate guide and be deflected on to the "acceptance" delivery belt. After sufficient time has elapsed from the moment when a can was thrust from the weighing head for the can to have been carried by the delivery belt beyond the guide associated with that head, all the guides may be again retracted into the position between the two belts by any suitable means obvious to those skilled in the art.

The guide 4 on the far side of the feed belt has, of course, four gaps formed in it, each gap coinciding with an entrance of one of the four short paths to the weighing heads. In order that no cans are either partially or wholly deflected into the short paths during the time when the rams are retracted and the cans are being fed into the waiting position, each gap is blocked by a guide which can be moved away from the gap during forward movement of the rams so as not to interfere with a can which is being thrust towards the weighing heads. Each of these guides comprises a horizontal arm 33 of an L-shaped rod, the arm 33 being arranged in a position parallel with the guides 4 and extending across one of the gaps. The L-shaped rod 35 is supported at its upper end by a shaft 36 rotatably supported above and parallel with the near edge of the feed belt 1. A crank 37 carried by the shaft 36 is connected, by means of a vertical link, to a first end of an arm 38 lying at right angles to the longitudinal axis of the shaft 36 and above and inclined to the path in which the carriage 13 travels during movement of the rams. The second end of the arm 38 is pivoted about a point lying beyond the position in which the carriage 13 lies when the rams are retracted. Carried by the arm 38 at a point along its length is a cam follower arranged to bear against an inclined cam surface mounted on the upper portion of the carriage 13, the cam follower being spring loaded against the cam by a spring attached to the crank 37. The cam surface on the carriage 13 is so formed that, as the carriage moves forward along the guides 14, the shaft 36 is rotated about its axis by movement of the crank 37 and each arm 33 accordingly swung upwardly and away from the gap across which it extends to permit a can to be moved through the gap and towards the associated weighing head.

As stated above, a can, on being fed to a weighing head and before it is weighed by the weighing unit, has its weight supported by a stripper plate. The stripper plate of each of the four weighing units is linked to the other three stripper plates and all are actuated by a single mechanism and thus constitute a single stripper plate S. The stripper plate is carried on two vertical posts 27, 27' slidably mounted in guides for movement in a vertical direction. The lower end of one of the posts is supported upon one end of a rocker lever 28 (FIGURE 2) pivotally mounted about an axis which lies parallel to the longitudinal axis of the cam shaft 10 and which passes through a point near the end of the rocket lever remote from that end supporting the vertical post 27. The longer arm of the rocker lever 28 is maintained in a substantially horizontal position by supporting its free end upon a movable stop 29, and the shorter arm of the rocker lever carries a cam follower. The lower end of the other one of the vertical posts is supported upon one end of another lever arm (not shown) pivotally mounted at its other end and mechanically linked with rocking lever 28 to pivot in conjunction with it.

On release of the locking mechanism 20 allowing the rams to move forward to feed a further four cans to the weighing head, movement of the arm 17 is arranged to actuate a switch 30 to energise a solenoid 31. Energisation of the solenoid 31 actuates a link 32 connected to the movable stop 29 to remove the stop from supporting the longer arm of the rocker lever 28 and so cause the weight of the stripper plate to pivot the rocker lever about its pivot point and bring the cam follower into contact with the profile of the second one of the two plate cams mounted on the cam shaft 10. As the cam follower follows the cam profile the stripper plate is lowered to allow the weighing operation to take place and then returned to its original position. On arrival of the stripper plate at its original position the movable stop is allowed to return to its original position. The cans weighed during the weighing operation are, of course, those cans positioned on the stripper plate by the immediately preceding stroke of the rams. A weighing operation is carried out during the first part of a forward stroke of the rams and is completed in time for the stripper plate to be returned to its original positions before the cans then being thrust forward push the cans which have been weighed on to the "rejection" delivery belt 7.

A weighing machine embodying the above described invention can be operated to weigh 160 articles per minute.

What is claimed is:

1. Weighing apparatus including a plurality of weighing units for simultaneously weighing a corresponding number of articles; feed mechanism for feeding a different article to be weighed on to the weighing head of each of the units in one operation; a first delivery channel into which is fed, after a weighing operation has been carried out upon articles on the weighing heads, every article which has been weighed; a second delivery channel adjacent said first channel; and a plurality of means movable across said first channel adjacent each of said weighing units for individually deflecting, from said first to said second channel, all articles above a predetermined weight.

2. Weighing apparatus as defined in claim 1 wherein said feed mechanism comprises a plurality of movable article pushers, sensing means on each pusher, engageable with articles in position to be pushed thereby, and holding means controlled by all of said sensing means, jointly, for holding all said pushers against movement in the absence of any one article.

3. Weighing apparatus as defined in claim 2 wherein said pushers are spring-actuated in article-pushing direction; said holding means comprising latch means for holding said pushers against the action of said spring.

4. Weighing apparatus as defined in claim 1 wherein said first and second delivery channels comprising adjacent conveyors, said last-named means comprising a swingable gate adjacent each weighing unit, swingable across said first conveyor for deflecting an overweight article directly from its weighing unit across said first conveyor to said second conveyor.

5. Weighing apparatus as claimed in claim 1 wherein the arrival from the feed mechanism of an article upon the weighing head of a weighing unit displaces the article previously positioned on the weighing head into the first delivery channel.

References Cited in the file of this patent
UNITED STATES PATENTS

| | | |
|---|---|---|
| 1,747,593 | Oates | Feb. 18, 1930 |
| 1,999,827 | Wardley | Apr. 30, 1935 |
| 2,116,895 | Howard | May 10, 1938 |
| 2,197,381 | Mansbendel | Apr. 16, 1940 |

FOREIGN PATENTS

| | | |
|---|---|---|
| 101,455 | Great Britain | Sept. 21, 1916 |